United States Patent [19]
Dendy

[11] 4,167,296
[45] Sep. 11, 1979

[54] PROTECTIVE CONTROL SYSTEM FOR MAGNETIC SUSPENSION AND MAGNETICALLY SUSPENDED DEVICES

[75] Inventor: Joe B. Dendy, Phoenix, Ariz.

[73] Assignee: Sperry Rand Corporation, New York, N.Y.

[21] Appl. No.: 866,117

[22] Filed: Dec. 30, 1977

[51] Int. Cl.² .............................................. F16C 39/00
[52] U.S. Cl. ...................................... 308/10; 74/5.46; 74/5.6 E
[58] Field of Search ................... 308/10; 74/5.4, 5 R, 74/5.46, 5.6 E

[56] References Cited
U.S. PATENT DOCUMENTS

| | | | |
|---|---|---|---|
| 3,742,769 | 7/1973 | Crutcher | 74/5 R |
| 3,902,374 | 8/1975 | Hoffman | 308/10 |
| 3,937,533 | 2/1976 | Veillette | 308/10 |
| 3,976,339 | 8/1976 | Sabnis | 308/10 |
| 4,078,436 | 3/1978 | Statts | 308/10 |
| 4,090,745 | 5/1978 | Dohugne | 308/10 |

Primary Examiner—R. Skudy
Attorney, Agent, or Firm—Howard P. Terry

[57] ABSTRACT

A protective control system is provided in a magnetic suspension system having a permanent magnetic and an electro-magnetic circuit for levitating a spinning rotor; normally effective axial stability between limiting positions is provided by a feed back servo system supplying control currents to a pair of solenoids for modulating the permanent magnetic field in the suspension gaps. The physical support system and the suspended apparatus are protected from damage due to excessive axial oscillatory translation of the suspended rotor by detection of such non-linear events and by the removal of the suspension command for a suitable time period. The suspension control is then returned to its initial state and is again set into operation to translate the suspended element asymptotically and smoothly to its desired central location.

9 Claims, 5 Drawing Figures

PROTECTIVE CONTROL SYSTEM FOR MAGNETIC SUSPENSION AND MAGNETICALLY SUSPENDED DEVICES

BACKGROUND OF THE INVENTION

1. Field of the Invention

The present invention relates generally to magnetic devices for safely suspending or levitating movable elements such as are intended for rotation about a predetermined axis, for example, a control moment gyroscope or a reaction wheel. More particularly, the invention relates to protective means for preventing damage to or destruction of such magnetic suspension devices when in operation and of the mechanism or craft supporting the magnetically suspended device.

2. Description of the Prior Art

While magnetic bearings or suspensions for spinning elements such as gyroscopic rotors are widely described in prior patents and in the other literature, typical prior art with respect to the present invention is believed to be represented by the U.S. patent application Ser. No. 433,431, filed Jan. 14, 1974, now U.S. Pat. No. 4,090,745, for a "Magnetic Suspension Apparatus with Magnetic Stiffness Augmentation" in the names of J. R. Dohogne and A. V. Sabnis issued as U.S. Pat. No. 4,090,745, May 23, 1978 and by the U.S. Pat. No. 3,976,339 for a "Magnetic Suspension Apparatus", issued Aug. 24, 1976 in the name of A. V. Sabnis, both assigned to Sperry Rand Corporation. These references will be discussed in further detail within the following material. In general, both reference relate to a magnetic bearing assembly for levitating a movable member either in rotation or in lineal translation and comprising a triple-loop magnetic circuit in which a permanent magnet establishes a quiescent or fixed flux across four magnetic gaps arranged to provide passive restoring forces transverse to the direction of the gap flux. The resulting inherent instability of the suspended element in the longitudinal or axial direction is overcome by an active electric feed back control system which supplies control currents in a pair of solenoids associated with the magnet gaps for modulating the permanent magnet flux therein, thereby providing stabilizing longitudinal or axial magnetic forces. In the event of failure of the magnetic support, or in the event that a severe shock load is accidentally imposed upon the suspending or suspended system, a back-up mechanical axially-disposed bearing system is provided which comes into play when such disturbances occur and for supporting the rotor when the active suspension system is not energized. Thus, only when such conditions are experienced, the rotating mass will be supported by a conventional ball bearing system, normally preventing destruction of the suspension system or associated suspended equipment.

While the configurations described in the aforementioned references perform successfully in many situations, additional problems arise in the operation of such suspensions, particularly those designed for very heavy rotors. The conditions at lift-off and in possibly oscillatory modes may be increasingly severe. High gain and wide band width servomechanisms are required for such rotors, ensuring the possibility of the excitation of violent non-linear oscillations. The more complex rotor systems are susceptible of many mechanical resonances which may couple to the input of the control system, so that the magnetic suspension system is susceptible of undesired oscillations because of the high servo loop gain and servo amplifier saturation effects. Impacting of the back-up bearing during initial suspension and during such oscillatory modes may damage the back-up bearings or produce damaging shocks to apparatus associated with the rotor system, for example, when the rotor is used to stabilize a space satellite.

SUMMARY OF THE INVENTION

The present invention provides reliable means for overcoming the defects of the prior art by providing smooth lift-off of the rotor system when placing it into operation and during operation by detecting an oscillatory mode in the suspension servo loop, removing the suspension currents to allow the oscillations to decay, and then putting the suspension system into its initial condition, whereby smooth lift-off of the suspended element is recycled.

In one form of the invention, the novel protective control system is provided in a magnetic suspension system of the general type described in the aforementioned references wherein a triple loop magnetic and electromagnetic circuit is used as a frictionless support for a spinnable rotor. Normally effective axial position stability between limiting positions is provided by a feed back system supplying electrical control currents to a pair of solenoids associated with a plurality of permanent magnetic field gaps. The support system and the supported apparatus is protected from damage caused by high initial suspension currents and by excessive oscillatory axial translations between the fixed and stationary components by threshold detection of such oscillations, whereupon the suspension command signal from the support servo is removed for a predetermined short time period. The suspension servo system is then reset to its initial state and is again placed in operation for translating the suspended component smoothly and asymptotically to its desired central location.

DESCRIPTION OF THE PREFERRED EMBODIMENTS

Figure 1:
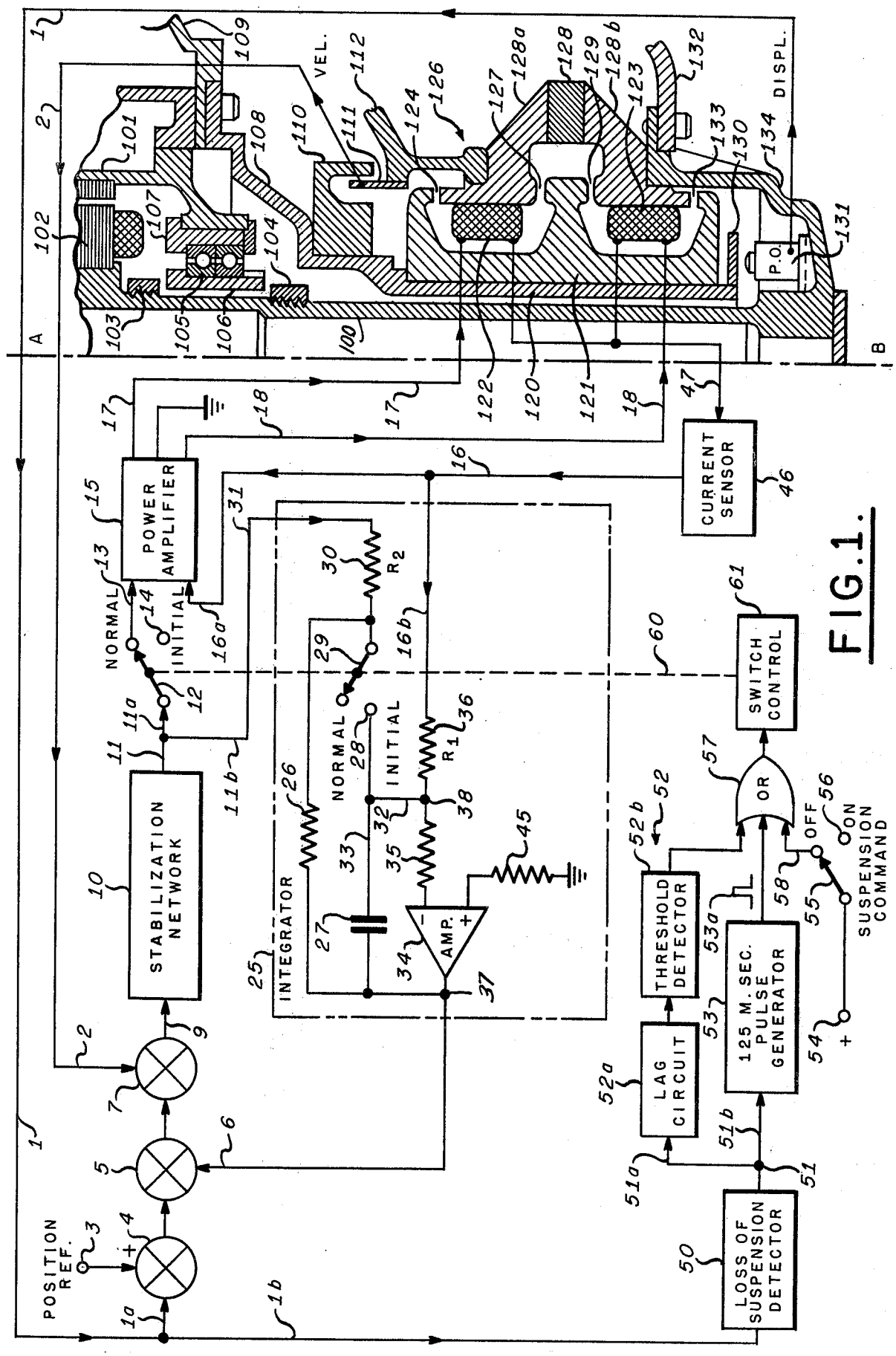
FIG. 1 illustrates, in partial cross-section, a typical magnetic field suspension system for supporting a rotor about its spin axis, together with a circuit diagram showing electrical components of the novel suspension control system, along with their interconnections and their connections to pick-off and actuator elements of the suspension.

FIG. 1 presents the novel control system as applied for use with a magnetic bearing support system of the kind disclosed in the aforementioned Sabnis U.S. Pat. No. 3,976,339. Such magnetic suspensions 160, 160' may be employed in inertial, reaction wheel, or gyroscopic apparatus of the kind, for example, described by Crutcher et al in the U.S. Pat. No. 3,742,769 for a "Gyroscope", issued July 3, 1973 and assigned to Sperry Rand Corporation, as illustrated generally in FIG. 5.

Referring again to FIG. 1, the bearing system 160 is illustrated in partial cross-section and has a hollow fixed axial tube 100 on which the stator part 102 of the electrical drive motor 101, 102 is attached, as well as annular mechanical stops 103, 104 which bound the maximum possible axial excursions of the rotating system relative to hollow tube 100. Other fixed (non-rotating) parts of the system are analogous to elements found in the Sabnis arrangement, including an end bell 134 from which the device is supported in fixed relation to tube 100 from a suitable base (FIG. 5) by flange 112, 132. Also supported in fixed relation to elements 100, 112, and 132 is the permanent magnet 128 cooperating with its fixed magnetic circuit elements 128a, 128b for defining one set of poles of four magnetic gaps 124, 127, 129, 133 as employed by Sabnis. It is recognized that the structure shown in FIG. 1 is actually a figure-of-revolution about the axis A–B, and that only half of the structure has been shown for convenience.

The other poles of the magnetic gaps are further defined in the manner disclosed by Sabnis by a normally rotating annular magnetic armature 121 whose cross-section has the general shape of a modified letter W. This annular magnetic armature 121 is disposed on a rotatable hollow tubular shaft 120 including bell 108. Within a pair of symmetrically disposed annular cavities defined between the rotating W-shaped magnetic armature 121 and the fixed magnetic circuit elements 128, 128a, 128b is mounted on the fixed assembly a pair of magnetic supporting solenoids 122, 123 which, as described by Sabnis, provide active axial suspension forces for the entire rotating system. The present invention is particularly concerned with providing improved axial support of the rotatable system.

Figure 5:
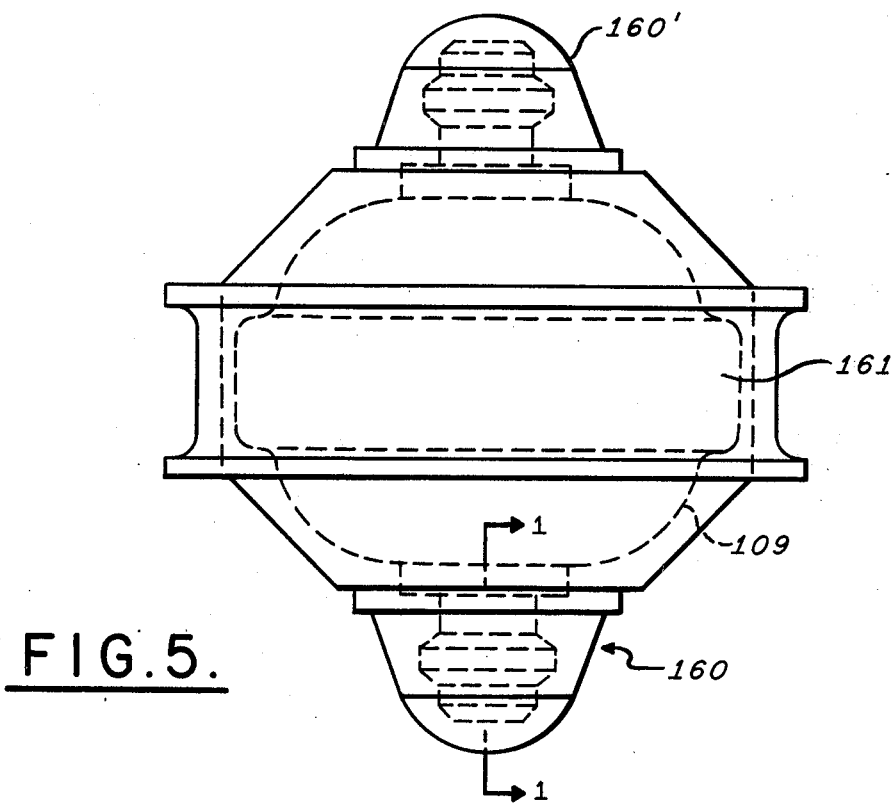
FIG. 5 is an elevation view of a typical gyroscope in which the invention has application.

End bell 108 supports the generally spherical rotor support shell 109 of gyroscopic rotor 161 (FIG. 5). It also supports the rotor 101 of electric motor 101, 102 for driving rotor 161 about axis A–B. Further, it supports the armature 111 of axial velocity pick-off 110, 111; finally, it provides support for the elements cooperable with axial limit stops 103, 104. For this latter purpose, bell 108 has an extension to support retainer ring 107 and the outer race of a conventional ball bearing assembly 105 disposed coaxially about the fixed axial tube 100. An annular ring 106 is supported within the inner race of bearing 105; ring 106 has an inner surface spaced by a small variable gap from the outer surface of tube 100. Ring 106, furthermore, is extended axially so that it presents opposed annular impact surfaces facing annular impact faces of limit stops 103, 104.

It is seen that the invention makes use of the magnetic suspension concept of the triple-loop, radially passive, axially active type as shown in the Sabnis patent, thus making a detailed description herein of its operation unnecessary. As disclosed in the Sabnis patent, the magnetically suspended rotor system makes use of the same back-up ball bearing 105 when the magnetic suspension is not activated or when, during operation, internal or external forces on the supported rotating system cause excessive axial excursions. The back-up bearing plays the important role of preventing actual physical contact of the magnetic pole faces. Furthermore, the magnetic suspension servo loop is necessarily a very high gain loop. This high gain loop, in combination with the many and varied structural resonances of the suspended rotor, its housing, and its mount may experience oxcillations at some resonant frequencies which will, unless suppressed, cause the rotor actually to collide with and to oscillate between mechanical stops 103, 104. This is clearly highly undesirable, especially in a space vehicle where such sharp mechanical disturbances can shake the vehicle and cause damage to the delicate instruments of its payload.

Accordingly, the present invention provides novel control means for initially suspending the rotor and thereafter for eliminating such undesired impacts so as to avoid destruction of the expensive installation or frustration of its purpose. In the control system of the present invention, the current normally flowing in the common conductor 47 coupled to magnetic support solenoids 122, 123 is supplied to a conventional current sensor 46 whose output on electrical lead 16 is a voltage proportional to current flow in lead 47 and serves as one input to the novel control system. Two other inputs are also variable inputs indicative of the instantaneous axial behavior of the rotating system; one is a voltage on lead 1 generally representative of the axial position of the magnetically suspended rotor relative to its stator as measured by a pick-off 130, 131 responsive to the position of rotatable shaft 120 with respect to the support housing 134. Pick-off 130, 131 may be a conventional eddy current proximity sensor. The second signal is a voltage proportional to the axial movement of the magnetic bearing rotor relative to its stator as measured as measured by a conventional inductive rate generator device which may, for example, include an annular coil 111 supported on the support housing 112 and cooperating with an array of magnets within the part 110 supported on rotor end bell 108. An axial position reference or biasing signal on terminal 3 is derived from a steady reference voltage generator (not shown) and is employed to establish the zero reference position of pick-off 130, 131 because the pick-off is of the type having no inherent zero output when in operation. Furthermore, a control signal on terminal 54 is derived from a steady reference voltage generator (not shown) upon closure of switch 55 for purposes yet to be described.

The rotor axial displacement signal on lead 1 is supplied to branching leads 1a, 1b, being coupled by lead 1a to one input of a conventional algebraic summation device 4. A second input of summation device 4 is the aforementioned positional reference voltage from terminal 3, whereby a position error signal is provided. The output of summation device 4 is applied as a first input to a similar algebraic summation device 5 along with a second input which is the output on lead 6 of an integrating circuit whose nature remains to be discussed in further detail. The algebraic sum output of device 5 is coupled to an input of the third summation device 7 along with the signal on lead 2 supplied by axial rate sensor 110, 111. The output 9 of summation device 7 is coupled to stabilzation and compensation network 10, which device may duplicate features of such networks as are described in the aforementioned U.S. Pat. No. 3,976,339 and patent application Ser. No. 433,431, now U.S. Pat. No. 4,090,748. The processed output of network 10 is coupled via lead 11 to branching leads 11a, 11b, flowing through lead 11a and switch 12 when in the position shown in FIG. 1 to lead 13 and thus to power or current amplifier 15 which may be also organized as shown in the immediately aforementioned references. Switch 12 has an open circuit position 14, as will be described. From power amplifier 15, the amplified output is coupled through the series connected magnetic suspension solenoids 122, 123. One further input to power amplifier 15 is furnished on lead 16a and is supplied by current sensor 46.

During normal operation of the magnetic suspension system, the current sensor 46 supplies its output via leads 16, 16b to the input of long time constant regenerative feed back integrator 25. The latter lead is coupled through series resistors 36, 35 and junction 38 to the inverting input of operational amplifier 34, the non-inverting input of which is coupled to ground through resistor 45. The output of amplifier 34 is normally fed back to its input 38 through capacitor 27 to provide the integral function in conventional fashion. The integrator's output passes through junction 37 via lead 6 to summation device 5. During initiation or re-initiation modes of operation, the integrator 25 is placed in its initial condition by coupling the output of network 10 through lead 11b and lead 31 to resistor 30, in a sense opposite to that of the signal on lead 16b, thence to the input teminal 38 via terminal 28 of switch 29 and leads 32 and 33. At the same time, the time constant of integrator 25 is substantially reduced, since resistor 30 is small compared to resistor 36. Also, resistor 26 is connected in parallel with capacitor 27, thus providing the desired initial current command signal on lead 11.

The status of switches 12, 29, which are shown for convenience as blade switches but which in practice would be transistor switches, is controlled simultaneously, as illustrated by the dashed line 60, by a switch control 61, the state of which is controlled by a conventional OR gate 57. The state of switches 12, 29 is determined according to the shaft displacement voltage on lead 1b and its effect on circuit 50; circuit 50 is a loss-of-suspension-detector which may take the form of a conventional threshold or maximum value detector. When the displacement voltage on lead 1b reaches a predetermined threshold value, an output is provided on conductor 51 and its branches 51a, 51b. Any output of detector 50 is thus coupled into parallel circuits 52 and 53. Delay circuit 52 which consists of a lag circuit 52a and a threshold detector 52b, may be characterized by a delay of, say, 3 seconds and delay circuit 53 may have a delay of, say, 125 milliseconds and may take the form of a conventional monostable flip-flop or other such short pulse generator. Any output of the circuits 52, 53 is coupled to OR gate 57 to which is also supplied a no suspension command signal from terminal 54 via switch 55. The presence of any one of the three input signals at the input of switch control 61, effectively places switches 12, 29 in their lower or initialize operation positions as shown in FIG. 1. No input to OR gate 57 effectively moves switches 12, 29 to the upper position, placing the system in its normal operating condition.

For purposes of illustration of the operation of the invention, it will be assumed for the moment that rotor 161 and its associated rotatable elements are not rotating with respect to the hollow axial tube 100 and that the instrument is in a force field such as a gravitational field having a component parallel to axis A–B. In this condition, the rotatable system is at its lowest axial position with the lower face of ring 106 lying against the face of stop 104. This situation comes about in part because of the inherent axial instability of the radially passive, axially active magnetic suspension and causes the unmodulated magnetic field in gaps 124, 127, 129, 133 to move the rotor to a position of minimum reluctance. At this position, the axial position signal from pick-off element 131 is a maximum. Alternatively, if the suspension system was de-energized at the moment the rotor poles were close to the upper stator poles, the rotor would move toward the upper poles and, hence, toward upper stop 103 and would hold there in spite of the gravitational force component. Without the present invention, the maximum displacement output of pick-off 130, 131, when applied through lead 1 and eventually through power amplifier 15 to the magnetic suspension solenoids 122, 123, would at once accelerate hollow shaft 120 and all of its supported rotatable associated elements upward, for example, toward its normal central position. However, the large inertia of the rotatable system, once the latter starts to translate, would tend to carry the rotatable system rapidly through the normal central position and to cause violent impact between ring 106 and the upper stop 103, thereby subjecting not only the rotatable system, but also the rotor housing and its supporting base to objectionable shock levels. Damage to the supporting base and its payload and particularly to the back-up ball bearing 105 may undesirably occur. Oscillations and repeated impaction of the stops 103, 104 may occur during placing the system in its initial state. During normal operation of the suspension system, undesirable oscillation levels may be reached which cause impacts between mechanical stops 103, 104.

Accordingly, the invention comprises a unique start-up or lift-off system for magnetic suspensions that, initially or after a temporary malfunction, puts the normally regenerative integral feed back integrator 25 in its initial condition to provide an initial signal of a magnitude such as to reduce substantially the effective magnitude of the position error when the rotor is against one of its stops. Thus, upon a suspension command or after a temporary shutdown, the initial suspension current is substantially reduced, thereby avoiding the aforementioned impacting of the stops.

Generally, it is seen that the magnetic suspension system operates exactly as described in the Sabnis patent. Changing axial position and a finite axial translational velocity of the rotor poles relative to the stator poles forming the gaps 124, 127, 129, 133 are detected by sensors 130, 131 and 110, 111 and are combined and passed through the conventional stabilization network 10, which may include conventional gain and filter networks and the like, to the input of power amplifier 15. It will be understood that the position signal is required primarily for placing the system in its initial condition. In addition to the teaching of Sabnis, the current exciting solenoids 122, 123 is measured by current sensor 46 and is applied as a direct inner-loop feed back to power input 16a of amplifier 15. If a persisting unbalancing axial force is encountered, such as during operation with the axis A–B substantially vertical in a constant gravitational field, the persistent current required through solenoids 122, 123 to overcome the force is integrated by circuit 25 and is fed back via lead 6 into summation device 5 and into the servo loop in a regenerative fashion. This event, in effect, shifts the effective zero velocity position upward by an amount just sufficient for the passive magnetic field to increase the upward force to hold steady the weight of the rotating system, the persistent current thereby asymptotically diminishing to zero so that substantially zero steady state current is required to maintain the axial suspension.

Prior to starting the suspension and normally prior to wheel spin-up by a suspension command initiated by operation of switch 55, to its ON position, the rotating system rests against the stop 104, for example, and hence, a maximum possible displacement error signal is present at the output of summer 4 and also at loss-of-suspension detector 50. The large command signal supplied by switch 55 to OR gate 57 fully dominates the effect of any output from delay devices 52 and 53, thereby causing switch control 61 to move both switches 12 and 29 to their respective lower initial-condition-establishing contacts 14, 28. Thus, the input to power amplifier 15 from network 10 is broken, while, at the same time, the position signal output of network 10 is applied to the input of integrator circuit 25 through resistor 30, thus forming a negative feed back loop. Also, resistor 26 is inserted in parallel with condenser 27. This polarity choice is made since the integrator normally provides positive or regenerative integral feed back, and the invention in the initiate mode requires an opposite polarity signal to buck out the initial positive position signal. This signal rapidly places the integrator circuit associated with amplifier 34 in its initial condition, the time constant $R_2C$ of the resistor-capacitor circuit 30–27 being small (well within the 125 millisecond delay time assumed for delay device 53). The normal time constant of the integrator associated with amplifier 34 is much longer, as determined by the time constant $R_1C$ of resistance-capacitance circuit 36–27. Accordingly, in the initial condition state of the integrator, it provides an output to summation device 5 which, when subtracted from the position signal at its second input, results in a current output from power amplifier 15 when reconnected to input lead 11 that is less than that needed for lifting the rotatable system off of the stop 104. In this manner, the control system has been placed in its initial state.

Figure 2:
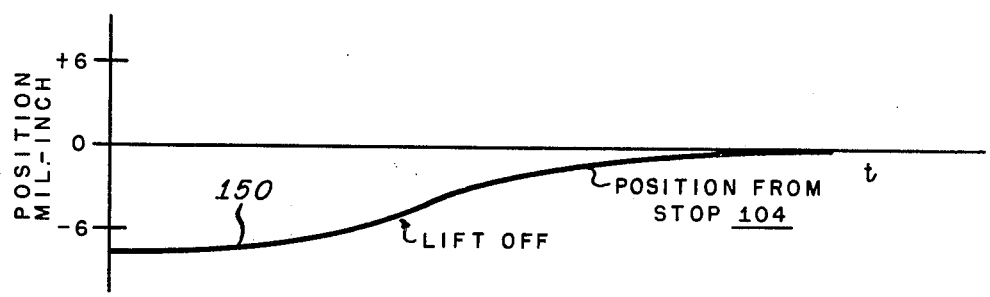
FIGS. 2, 3 and 4 are graphs illustrating operation of the invention.
Figure 3:
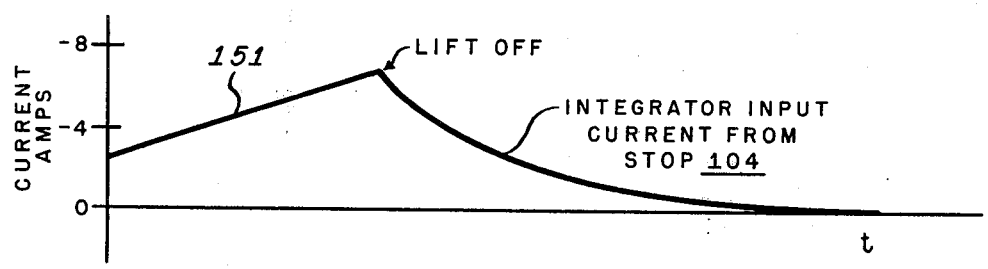
Figure 4:

A suspension command operates to move switches 12, 29 to their upper or normal operation positions through the removal of the source 54 input to gate 57. Since the current supplied to suspension solenoids 122, 123 remains at this juncture insufficient to lift the rotatable system and thus to lift ring 106 off of stop 104, the rotatable system is not at once translated. However, the signal on lead 16, representing the current through solenoids 122, 123, is now being applied to integrator 25, so the current through the solenoids tends slowly to increase until lift off actually occurs, the hollow shaft 120 and its associated rotating elements moving slowly away from stop 104. The output of position pick-off 130, 131 now decreases, now decreasing the current flow into the suspension coils 122, 123 and hence the input to integrator 25. Ultimately, due to the now regenerative integral term, the rotatable system is translated axially in an asymptotic manner to its normal or centered axial location. The current to the stabilizer coils and hence to the integrator input falls substantially to zero, wiping out the initial integrator bias. The curves 150, 151, 152 of the respective FIGS. 2, 3 and 4 are further explanatory of this operation.

Consider that the rotor is in operation in a steady state suspended position, so that there is substantially no positional error signal out of summation device 5. During such normal operation, a mechanical or electrical disturbance may occur, which could cause violent touch down or collisions between ring 106 and stops 103, 104. Such an undesired event may be caused by oscillatory translation of the rotating system along its axis due to inherent servo loop characteristics, a severe inertial loading of the rotating system, or the like. Thus, should ring 106 approach one of the stops, the loss-of-suspension-detector 50 detects the absolute magnitude of the correspondingly large displacement signal and, if it is greater than its threshold, triggers pulse generator 53. Circuit 53 may be a conventional one shot or multi-vibrator producing a single 125 millisecond output pulse 53a which, in turn, passes through OR gate 57 to cause switches 12, 29 to be moved down to their lower positions for resetting the servo loop including integrator system 25, in its initial state. Thus, the suspended elements are allowed to contact the closest stop. Pulse generator 53 has a time constant, say, of 125 milliseconds, which is normally sufficient time to allow disturbances in the suspended device and its control system to settle out and for the servo system to become quiescent. After the 125 millisecond interval, the pulse generator 53 automatically turns its output off and switches 12, 29 return to their normal upper locations, repositioning the rotor asymptotically in its normal centered position as previously described. Should the disturbance persist or a malfunction occur which does not settle out, that is, should the position signal persist at a value above the threshold value of detector 50, the three second delay functions to provide a continuing signal through OR gate 57, permanently moving switches 12, 29 downward and never returning the control of the suspension to its normal state. As previously noted, this condition may readily be recognized by the use of appropriate radio telemetric equipment, allowing starting operation of a redundant control system usually provided in such applications.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. In a magnetic suspension apparatus of the type in which a suspended member is in inherently unstable equilibrium along one of its suspension axes, said apparatus including spaced mechanical stop means for limiting the maximum displacement of said suspended member along said axis and a servo loop for normally stabilizing said suspended member along said axis including electromagnetic actuator means for normally positioning said suspended member apart from said stop means, said servo loop including:

first means for supplying a signal varying in accordance with the position of said suspended member from said normal position along said axis,
said signal having a maximum value when said suspended member is at one of said stop means,
second means responsive to said signal for normally controlling said electromagnetic actuator means to maintain said signal substantially at zero magnitude, thereby normally maintaining said suspended member in said normal position, and
third means for placing said servo loop in said initial state prior to normal suspension operation comprising:
integrator means having an output coupled with said position signal, and
switch means responsive to said position signal in said initial state for placing said integrator means in said initial state so as to supply said integrator output in a polarity opposing said position signal and of a magnitude to reduce substantially said maximum value thereof, and in said normal condition, to supply said position signal of reduced value to said second means.

2. In a magnetic suspension apparatus of the type in which a suspended member is in inherently unstable equilibrium along a major suspension axis thereof, said apparatus including spaced apart stop means for limiting the maximum displacement of said suspended member along said major axis, a servo loop for normally stabilizing said suspended member along said major axis including electromagnetic actuator means for normally positioning said suspended member apart from said stop means, said servo loop including integrator means responsive to energization of said electromagnetic actuator means for supplying a regenerative integral feed back signal to the input of said servo loop to compensate for any sustained force tending to maintain a corresponding sustained energization of said electromagnetic actuator means, the improvement providing means for conditioning said suspension apparatus for normal operation comprising:
 first means for supplying a signal varying in accordance with the position of said suspended member from said normal position along said major axis, said signal having a maximum value when said suspended member is at one of said stop means,
 second means responsive to said signal for normally controlling said electromagnetic actuator means to maintain said signal substantially at zero magnitude, thereby maintaining said suspended member in normal position, and
 switch means having a first state for initially removing said position signal from said electromagnetic actuator means and for supplying the same instead to said integrator means in a polarity opposite to said normal energization of said integrator means whereby to provide an integrator output to said loop in opposition to said position signal to reduce said maximum value thereof to a value insufficient to move said suspended member away from one of said stop means and having a second state for removing said position signal from said integrator means and for supplying said reduced value position signal to said electromagnetic actuator means.

3. Apparatus as described in claim 2 wherein said integrator means is responsive during both said normal and initial operation conditions to an inverted version of said position signal and to the current flowing through said electromagnetic actuator means and is responsive during said normal operation condition only to said actuator current.

4. Apparatus as described in claim 4 further including command means for operating said switch means between said states comprising threshold means for detecting increase of said position signal above a predetermined threshold magnitude.

5. Apparatus as described in claim 4 wherein said command means includes threshold detector means.

6. Apparatus as described in claim 5 wherein said command means includes short pulse generator means responsive to said threshold means for temporarily actuating said switch means.

7. In a magnetic suspension device of the kind in which first and second concentrically disposed components are cooperatively positioned by electromagnetic actuator means for relative rotation about an axis, said electromagnetic actuator means in normal operation supporting said first with respect to said second concentrically disposed component in unstable equilibrium at a predetermined locus substantially along said axis between stop means limiting abnormal relative excursion thereof, protective apparatus for said magnetic suspension device having first and second states and comprising:
 generator means for generating a first signal representative of the axial position of said first component with respect to said second component,
 integrator means,
 algebraic summation means responsive to said first signal and to said integrator means for producing a second signal for control purposes,
 said electromagnetic actuator means being responsive to said second signal,
 said integrator means being selectively responsive during said first state to an inverted version of said second signal and to current flow within said electromagnetic actuator means, and
 said integrator means being selectively responsive during said second state only to said electromagnetic actuator means current flow.

8. Apparatus as described in claim 7 further including:
 threshold detector means for detecting any increases of said first signal greater than a predetermined value and for producing a third signal upon the occurrence thereof, and
 switch means responsive to the presence of said third signal for removing said second signal from said electromagnetic actuator means.

9. Apparatus as described in claim 8 wherein said switch means, in response to the presence of said third signal, furthermore changes the effective time constant of said integrator means from a long to a short value.

* * * * *